United States Patent
Wild et al.

(10) Patent No.: US 6,983,597 B2
(45) Date of Patent: Jan. 10, 2006

(54) METHOD AND ARRANGEMENT FOR CONTROLLING AN INTERNAL COMBUSTION ENGINE

(75) Inventors: Ernst Wild, Oberriexingen (DE); Sabine Wegener, Asperg (DE); Rainer Hild, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 10/456,498

(22) Filed: Jun. 9, 2003

(65) Prior Publication Data

US 2004/0006985 A1 Jan. 15, 2004

(30) Foreign Application Priority Data

Jun. 7, 2002 (DE) .......................................... 102 25 307

(51) Int. Cl.
 *F02B 33/44* (2006.01)

(52) U.S. Cl. .................... 60/611; 60/605.1; 123/564
(58) Field of Classification Search ............... 60/611, 60/605.1, 600–603; 123/560–564
See application file for complete search history.

(56) References Cited

U.S. PATENT DOCUMENTS

| | | | | |
|---|---|---|---|---|
| 3,018,617 A | * | 1/1962 | Kelgard .................... 60/611 |
| 4,512,153 A | * | 4/1985 | Kawabata et al. ............ 60/611 |
| 4,774,812 A | * | 10/1988 | Hitomi et al. ................ 60/611 |
| 4,870,822 A | * | 10/1989 | Kamimaru .................... 60/611 |
| 4,873,961 A | * | 10/1989 | Tanaka ........................ 60/601 |
| 4,956,973 A | * | 9/1990 | Fortnagel et al. ............. 60/611 |
| 5,526,645 A | * | 6/1996 | Kaiser .......................... 60/611 |
| 5,694,899 A | * | 12/1997 | Chvatal et al. ............... 60/611 |
| 6,318,085 B1 | * | 11/2001 | Torno et al. .................. 60/611 |

FOREIGN PATENT DOCUMENTS

| | | | | |
|---|---|---|---|---|
| DE | 31 29 686 | | 2/1983 | |
| DE | 3512557 A1 | * | 10/1985 | .................. 60/611 |
| DE | 196 09 230 | | 9/1997 | |
| FR | 2557636 A1 | * | 7/1985 | .................. 60/611 |
| FR | 2560289 A1 | * | 8/1985 | .................. 60/611 |

* cited by examiner

*Primary Examiner*—Thai-Ba Trieu
(74) *Attorney, Agent, or Firm*—Walter Ottesen

(57) ABSTRACT

The invention is directed to a method and an arrangement for controlling an internal combustion engine (1) having a compressor (5) for compressing the air drawn in by suction by the engine (1). The compressor is especially an exhaust-gas turbocharger. With the method and arrangement, a requirement-proper and timely opening of a valve (10) of an air path (15) is ensured for avoiding compressor pumping. The air path (15) bypasses the compressor (5). The valve (10) of the air path (15), which bypasses the compressor (5), is controlled in dependence upon at least one pregiven characteristic line (20, 25) of a compressor characteristic field.

12 Claims, 2 Drawing Sheets

METHOD AND ARRANGEMENT FOR CONTROLLING AN INTERNAL COMBUSTION ENGINE

BACKGROUND OF THE INVENTION

Internal combustion engines are already known which include a compressor for compressing the air drawn in by suction by the engine. Compressors of this kind can, for example, be in the form of an exhaust-gas turbocharger. An air path is provided which bypasses the compressor and the air mass flow, which bypasses the compressor in this manner, is controlled by means of a so-called circulation valve. The air supply to the engine is controlled by means of a power adjusting member, for example, a throttle flap. When the throttle flap is suddenly closed, the air mass flow abruptly reverses into the intake manifold of the engine. The flow at the charger veins of the compressor is interrupted at high compression because of the low air mass flow. The compression collapses. A charging pressure again builds up at lower compression. This leads to a pumping of the compressor which can load the shaft of the compressor or can cause disturbing noises. If, however, the circulation valve is opened when the throttle flap closes, then the air flows in the flow direction downstream of the compressor flows again via the air path in the flow direction ahead of the compressor and therefore in a circle. In this way, an unstable operation of the compressor is prevented. The circulation valve is opened when a gradient of the difference between actual and a desired charging pressure exceeds a pregiven threshold value or when the quotient of the actual charging pressure and an ambient pressure drops below a pregivable threshold which is dependent upon the engine rpm.

SUMMARY OF THE INVENTION

The method and arrangement of the invention for controlling an internal combustion engine afford the advantage with respect to the above that a valve of an air path, which bypasses the compressor, is controlled in dependence upon at least a pregiven characteristic line of a compressor characteristic field. In this way, and for a suitable input of this characteristic line, it can be ensured that the valve is opened only when really necessary.

An especially need-oriented control of the valve in the air path results when the at least one pregiven characteristic line is selected as pump limit of the compressor characteristic field. In this case, it is ensured that the valve is only opened when the compressor pump is utilized.

It is especially advantageous when a pressure ratio across the compressor is pregiven via the at least one pregiven characteristic line in dependence upon a desired air volume flow. A timely opening of the valve in the air path is ensured when utilizing the desired air volume flow as input quantity of the compressor characteristic field. A timely opening of the valve in the air path protects the shaft of the compressor and avoids unnecessary noise.

A simple possibility for driving the valve in the air path is provided with the pregiven air ratio.

It is especially advantageous when the valve is opened as soon as an actual value of the pressure ratio exceeds the pressure ratio, which is pregiven by a first pregiven characteristic line, and when the valve is closed as soon as an actual value of the pressure ratio drops below the pressure ratio pregiven by a second pregiven characteristic line. In this way, a hysteresis can be realized and, for a suitable spacing of these two characteristic lines, a continuous opening and closing of the valve in the air path is avoided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
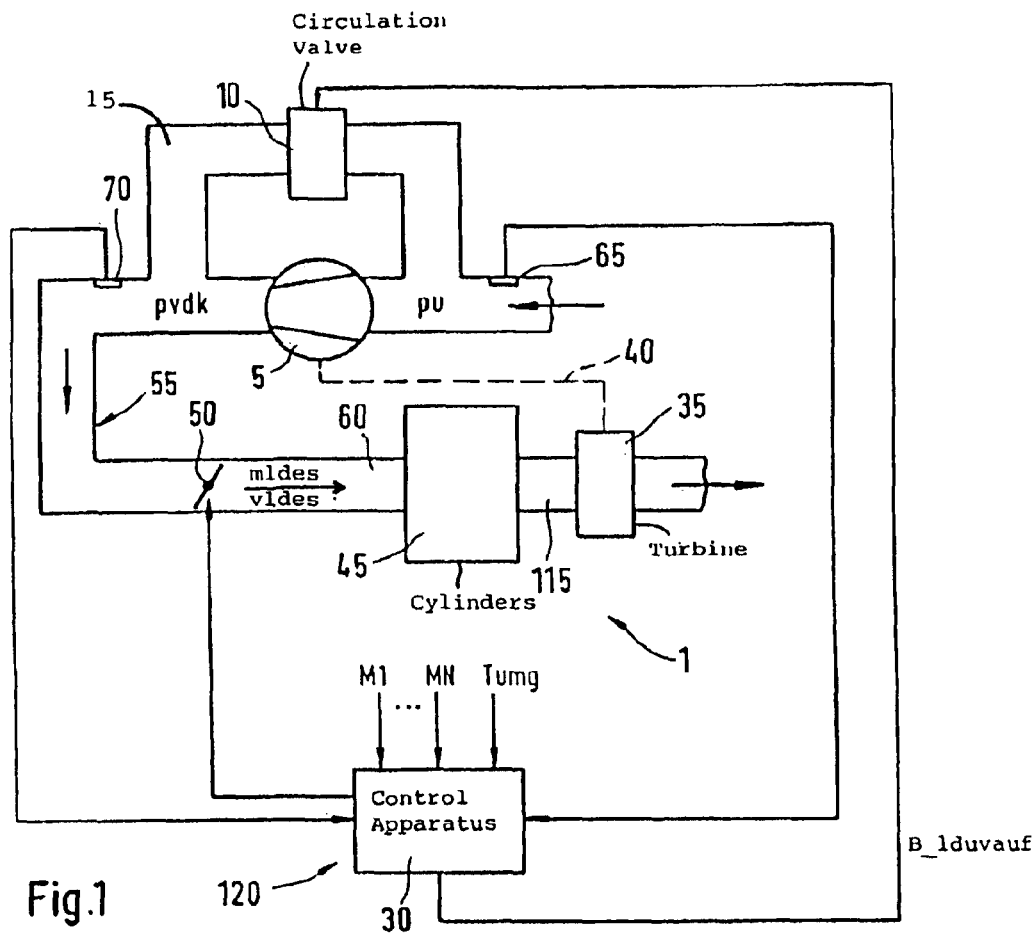
FIG. 1 is a schematic of an internal combustion engine and an arrangement according to the invention.

In FIG. 1, reference numeral 1 identifies an internal combustion engine which is here, by way of example, configured as a spark-ignition engine. The engine 1 includes one or several cylinders 45 to which fresh air is supplied via an air supply 55. The control of the desired air mass flow mldes takes place via a power actuating element 50 which, in this embodiment, is configured as a throttle flap. A section of the air supply 55 follows the throttle flap in the flow direction and is configured, in this embodiment, as an intake manifold 60. The intake manifold 60 is connected to the combustion chamber of the particular cylinder 45 by a corresponding inlet valve (not shown) of this particular cylinder 45. For example, in the case of the so-called intake manifold injection, the fuel can be injected into the intake manifold 60 by an injection valve (not shown in FIG. 1) in the flow direction ahead of the inlet valve. The exhaust gases, which arise during the combustion in the cylinders 45, are conducted via respective outlet valves of the cylinders 45 into an exhaust-gas channel 115 and there drive a turbine 35 of an exhaust-gas turbocharger. The turbine 35 drives a compressor 5 via a shaft 40 and the compressor compresses the air supplied via the air feed 55 to the cylinders 45. The flow direction of the air in the air feed 55 and in the outlet channel 115 is shown in each case by arrows in FIG. 1. A first pressure sensor 65 is mounted in the air feed 55 in the flow direction ahead of the compressor 5. This pressure sensor 65 measures the pressure in the air feed 55 which lies in flow direction ahead of the compressor 5. This pressure will be assumed to be ambient pressure pu by way of example in the following.

A second pressure sensor 70 is mounted in the air feed 55 in flow direction after the compressor 5. The second pressure sensor 70 measures the pressure pvdk present in the air feed 55 in flow direction after the compressor 5. The pressure pvdk is, in this embodiment, the pressure ahead of the throttle flap 50. In FIG. 1, an air path 15 is provided which bypasses the compressor 5 and is therefore connected in parallel therewith. A valve 10 is mounted in the air path 15 and is identified in the following also as a circulation valve. The air mass flow through the air path 15 can be controlled via the circulation valve 10. The first pressure sensor 65 and the second pressure sensor 70 are connected to means 30 for driving the circulation valve 10.

The arrangement of the invention includes the means 30 and is identified in FIG. 1 by reference numeral 120. The means 30 are also called control apparatus in the following and can, for example, be configured as an engine control apparatus or can be integrated in an engine control apparatus. The control apparatus 30 is therefore also connected to the circulation valve 10 in order to drive the same. Furthermore, a measurement signal for the ambient temperature Tumg is supplied to the control apparatus 30 by a measuring device not shown in FIG. 1. Also, and according to FIG. 1, N torque requests M1, . . . MN from various modules of the vehicle are supplied in the control apparatus 30. These modules are not shown in FIG. 1 and can be configured, for example, as the following: drive slip control, anti-blocking system, electronic accelerator pedal, et cetera. The accelerator pedal position of the electronic accelerator pedal can especially be interpreted as a torque request of the driver of the motor vehicle.

After the coordination of the driver request torque with the torque requests of additional modules of the vehicle (as mentioned above), for example, the control apparatus 30 determines a resulting actuating quantity, for example, a resulting desired engine output torque or a desired engine output power. The resulting actuating quantity is converted in the control apparatus 30 into the desired air mass flow mldes with the aid of ignition angle operating degrees and lambda operating degrees for the air/fuel mixture in a manner known per se. From this, the desired position of the throttle flap 50 for setting the desired air mass flow mldes is computed. As shown in FIG. 1, the control apparatus 30 then controls the throttle flap for adjusting the desired air mass flow mldes.

Figure 2:
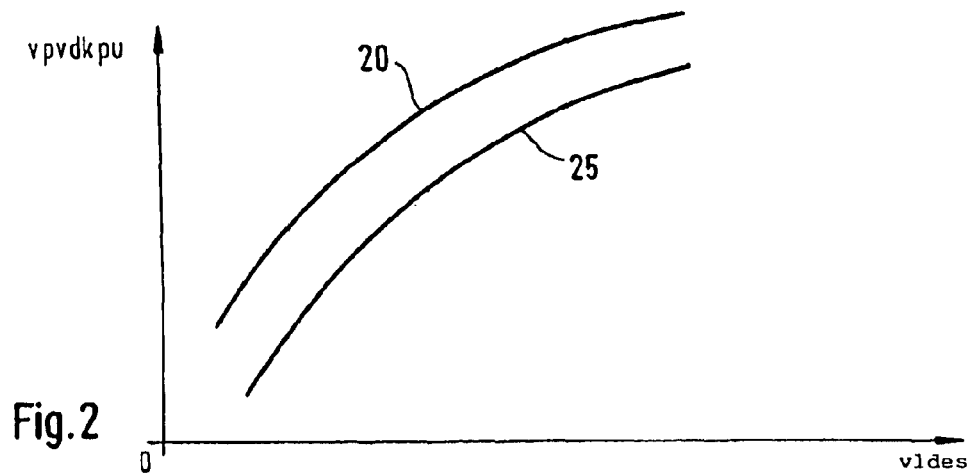
FIG. 2 shows two characteristic lines for driving a circulation valve of the compressor; and, FIG. 3 is a schematic showing the arrangement and method of the invention.

In FIG. 2, a compressor pressure ratio vpvdkpu is plotted as a function of a desired air volume flow vldes. In FIG. 2, a first characteristic line 20 and a second characteristic line 25 are shown which are part of a compressor characteristic field of the compressor 5. Here, the first characteristic line 20 runs above the second characteristic line 25 and therefore exhibits larger values for the compressor pressure ratio vpvdkpu for the same values of the desired air volume flow. A pressure ratio vpvdkpu across the compressor 5 is pregiven by the two characteristic lines (20, 25) in dependence upon respective desired air volume flows vldes. The first characteristic line 20 defines a pump limit of the compressor characteristic field. Accordingly, if the assigned pregiven value of the compressor pressure ratio vpvdkpu of the first characteristic line 20 is exceeded for a pregiven value of the desired air volume flow vldes, then the compressor pumps if the circulation valve 10 is not opened. The pregiven compressor pressure ratio vpvdkpu is an input value for the quotient of the pressure pvdk in flow direction downstream of the compressor 5 and the ambient pressure pu in flow direction ahead of the compressor 5, that is, the quotient pvdk/pu.

The configuration and operation of the control apparatus 30 for realizing the method of the invention will now be explained in greater detail with respect to the block diagram of FIG. 3.

A first logic element 80 is configured as a multiplication element. On the one hand, the desired air mass flow mldes and, on the other hand, the reciprocal of the standard density ρ0 of the air at 273 K and 1013 hPa are supplied to the logic element 80. The multiplication product is supplied as an output quantity of the first logic element 80 to a second logic element 85 which is likewise configured as a multiplication element. The term (1013 hPa/pu)*(Tumg/273 K) is supplied as a further input quantity to the second logic element 85. The product formed is supplied as an output quantity of the second logic element 85 to a third logic element 90 which likewise is configured as a multiplication element. The output quantity A of a third characteristic line 110 is supplied to the third logic element 90. The input quantity of the third characteristic line 110 is the ambient temperature Tumg. The output quantity A according to the third characteristic line 110 is formed from the ambient temperature Tumg as follows:

$$A = \sqrt{\frac{293 \text{ K}}{Tumg}}.$$

The product, which is formed in the third logic element 90, is the desired air volume flow vldes and is supplied as an input quantity to the first characteristic line 20 and the second characteristic line 25. A first compressor pressure ratio vpvdkpu1 corresponding to the exemplary course of the first characteristic line 20 in FIG. 2 is an output quantity of the first characteristic line 20. A second pregiven compressor pressure ratio vpvdkpu2 corresponding to the trace of the second characteristic line 25 of FIG. 2 is an output quantity of the second characteristic line 25. The first pregiven compressor pressure ratio vpvdkpu1 is supplied to a first comparator member 95. The second pregiven compressor pressure ratio vpvdkpu2 is supplied to a second comparator member 100. An actual value vpvdkpuact of the compressor pressure ratio is also supplied to the first comparator member 95 and the second comparator member 100 as input quantities. The actual value vpvdkpuact results as the quotient from the measured value of the second pressure sensor 70 and the first pressure sensor 65 as follows:

$$vpvdkpuact = pvdk/pu.$$

The output of the first comparator member 95 is supplied to a set input S of an SR-flip-flop 105; whereas, the output of the second comparator member 100 is supplied to a reset input R of the SR-flip-flop 105. A non-inverting output Q of the SR-flip-flop 105 forms the drive signal for the circulation valve 10. This drive signal is identified in FIG. 3 and in FIG. 1 by B_lduvauf.

In the first comparator member 95, a check is made as to whether the actual value vpvdkpuact of the compressor pressure ratio is greater than the first pregiven compressor pressure ratio vpvdkpu1. If this is the case, then the SR-flip-flop 105 is set via the set input S of this SR-flip-flop. The non-inverting output Q of the SR-flip-flop 105 is thereby set and the level of the output signal B_lduvauf is set to "high". In this way, the circulation valve 10 is so driven that it opens. The air then flows in a circle in flow direction downstream of the compressor 5 via the air path 15 again in flow direction ahead of the compressor 5. In this way, an unstable operation of the compressor 5 is prevented because the pump limit of the compressor characteristic field, which is represented by the first pregiven characteristic line 20, is exceeded with the actual value vpvdkpuact of the compressor pressure ratio exceeding the first pregiven compressor pressure ratio vpvdkpu1. Because of the opening of the circulation valve 10, the compressor pumping is, however, prevented. The desired air volume flow vldes is the basis of the comparison in the first comparator member 95. For this reason, the circulation valve 10 is timely opened with the closing of the throttle flap 50. The opening of the circulation valve 10 takes place only when the pump limit is exceeded in accordance with the first pregiven characteristic line 20 and only when the requirement is actually present in order to prevent the compressor pumping and therefore an unstable operation of the compressor 5. The drive to open the circulation valve 10 takes place in dependence upon the first pregiven characteristic line 20 of the compressor characteristic field.

In the second comparator member 100, a check is made as to whether the actual value vpvdkpuact of the compressor pressure ratio is less than or equal to the second pregiven compressor pressure ratio vpvdkpu2. If this is the case, then the reset input R of the SR-flip-flop 105 is set and therefore the SR-flip-flop 105 is reset. With this, the non-inverting output Q of the SR-flip-flop 105 is reset and the output signal B_lduvauf is set to "low". In this way, the circulation valve 10 is driven in such a manner that it closes the air path 15. In this way, the circulation valve 10 is driven to close the air path 15 in dependence upon the second pregiven characteristic line 25. The second pregiven characteristic line 25 lies below the first pregiven characteristic line 20. For this reason, a hysteresis is realized which prevents a continuous switchover of the circulation valve 10 from the opened into the closed state and from the closed state into the open state for actual values vpvdkpuact which oscillate about the first pregiven characteristic line 20. Because the second pregiven characteristic line 25 lies below the first pregiven line 20, it is ensured that, when closing the circulation valve 10, the actual value vpvdkpuact of the compressor pressure ratio lies below the pump limit according to the first pregiven characteristic line 20 and therefore, in any event, a compressor pumping is prevented.

Figure 3:
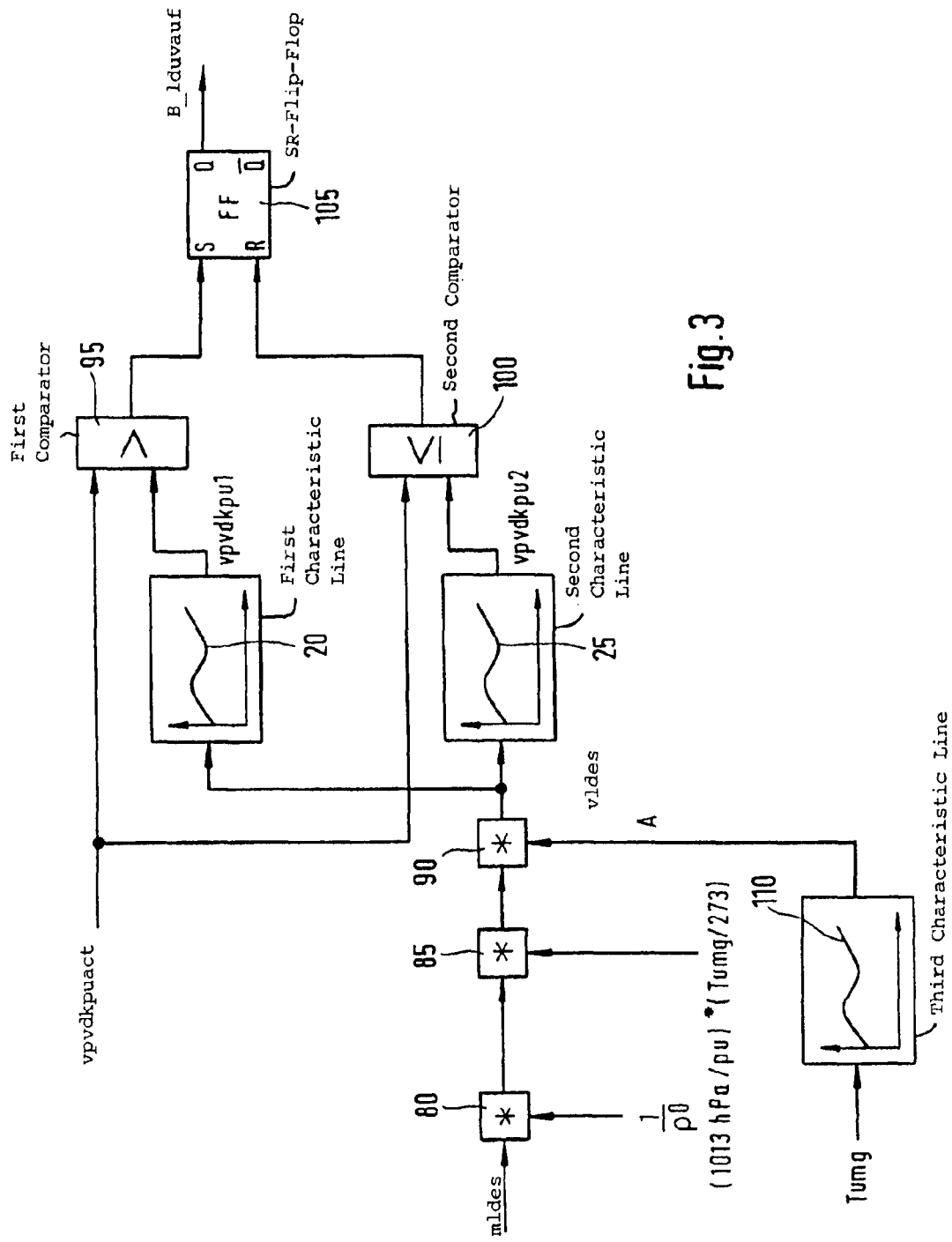

The desired air volume flow vldes, which is temperature corrected in accordance with FIG. 3, is used for the computation of the pump limit in accordance with the first pregiven characteristic line 20 in order that the circulation valve 10 opens on time. For this reason, the opening of the circulation valve 10 begins with the removal of the foot from the accelerator pedal and therefore with the closing of the throttle flap 50. The circulation valve 10 is open before the actual air volume flow vlact, which follows the desired air volume flow vldes, exceeds the pump limit in accordance with the first pregiven characteristic line 20. The desired air volume flow vldes, which is temperature corrected in accordance with FIG. 3, is computed from the product of the uncorrected desired air volume flow vldes_unkorr and the output quantity, which is formed by the third characteristic line 110, namely:

$$A = \sqrt{\frac{293\,K}{Tumg}}.$$

The output quantity A contains the ambient temperature Tumg and is referred to the standard temperature of 293 K used in the compressor characteristic field. Accordingly, the following applies:

$$vldes = vldes\_unkorr * \sqrt{\frac{293\,K}{Tumg}}.$$

The uncorrected desired air volume flow vldes_unkorr is computed in accordance with FIG. 3 from the quotient of the desired air mass flow mldes and the instantaneous density ρ of the air as follows:

$$vldes\_unkorr = mldes/\rho.$$

One obtains the instantaneous density ρ of the air by adapting the standard density ρ0 at 273 K and 1013 hPa to the ambient pressure factor fpu=1013 hPa/pu and the ambient temperature factor ftumg=Tumg/273 K. In this way, the instantaneous density ρ of the air can be determined from quantities, which are known in the control apparatus 30, such as the ambient pressure pu and the ambient temperature tumg.

In the following equations, the instantaneous density ρ of the air is substituted by the standard density ρ0 of air, the ambient pressure factor fpu and the ambient temperature factor fTumg:

$$vldes\_unkorr = mldes/\rho0 * 1013\ hPa/pu * Tumg/273\ K.$$

From this, there results:

$$vldes = mldes/\rho0 * 1013\ hPa/pu * Tumg/273\,K * \sqrt{\frac{293\,K}{Tumg}}.$$

The desired air volume flow vldes, which is formed in this manner, is at the output of the third logic element 90 in accordance with FIG. 3.

It is understood that the foregoing description is that of the preferred embodiments of the invention and that various changes and modifications may be made thereto without departing from the spirit and scope of the invention as defined in the appended claims.

What is claimed is:

1. A method for controlling an internal combustion engine having a compressor for compressing the air inducted by the engine, the method comprising the step of controlling a valve of an air path bypassing said compressor in dependence upon at least one pregiven characteristic line of a compressor characteristic field.

2. The method of claim 1, comprising the further step of inputting a pressure ratio (vpvdkpu) across said compressor in dependence upon a desired air volume flow (vldes) utilizing said at least one pregiven characteristic line.

3. The method of claim 1, wherein the at least one pregiven characteristic line is selected as a pump limit of the compressor characteristic field.

4. The method of claim 1, wherein said compressor is an exhaust-gas turbocharger.

5. A method for controlling an internal combustion engine having a compressor for compressing the air inducted by the engine, the method comprising the step of directly controlling a valve of an air path bypassing said compressor in dependence upon at lease one pregiven characteristic line of a compressor characteristic field.

6. A method for controlling an internal combustion engine having a compressor for compressing the air inducted by the engine, the method comprising the steps of:

controlling a valve of an air path bypassing said compressor in dependence upon at least one pregiven characteristic line of a compressor characteristic field;

inputting a pressure ratio (vpvdkpu) across said compressor in dependence upon a desired air volume flow (vldes) utilizing said at least one pregiven characteristic line; and, opening said valve when an actual value (vpvdkpuact) of the pressure ratio exceeds the pressure ratio (vpvdkpu) pregiven by said one pregiven characteristic line.

7. A method for controlling an internal combustion engine having a compressor for compressing the air inducted by the engine, the method comprising the steps of:

controlling a valve of an air path bypassing said compressor in dependence upon at least one pregiven characteristic line of a compressor characteristic field;

inputting a pressure ratio (vpvdkpu) across said compressor in dependence upon a desired air volume flow (vldes) utilizing said at least one pregiven characteristic line; and, wherein said pregiven characteristic line is a first characteristic line of said compressor characteristic field and said characteristic field has a pregiven second characteristic line; and, said valve is closed when an actual value (vpvdkpuact) of said pressure ratio falls below the pressure ratio pregiven by said second pregiven characteristic line.

8. A method for controlling an internal combustion engine having a compressor for compressing the air inducted by the engine, the method comprising the steps of:

controlling a valve of an air path bypassing said compressor in dependence upon at least one pregiven characteristic line of a compressor characteristic field;

inputting a pressure ratio (vpvdkpu) across said compressor in dependence upon a desired air volume flow (vldes) utilizing said at least one pregiven characteristic line; and, wherein the desired air volume flow (vldes) is computed from a desired air mass flow (mldes) and an instantaneous air density ($\rho$).

9. The method of claim 8, wherein the instantaneous air density ($\rho$) is computed in dependence upon the ambient temperature (Tumg) and the ambient pressure (pu).

10. A method for controlling an internal combustion engine having a compressor for compressing the air inducted by the engine, the method comprising the steps of:

controlling a valve of an air path bypassing said compressor in dependence upon at least one pregiven characteristic line of a compressor characteristic field;

inputting a pressure ratio (vpvdkpu) across said compressor in dependence upon a desired air volume flow (vldes) utilizing said at least one pregiven characteristic line; and, wherein the desired air volume flow (vldes) is temperature corrected.

11. An arrangement for controlling an internal combustion engine having a compressor for compressing the air inducted by said engine, the arrangement comprising:

an air path bypassing said compressor and including a valve; and, means for driving said valve in dependence upon at least a pregiven characteristic line of a characteristic field of said compressor.

12. The arrangement of claim 11, wherein said compressor is an exhaust-gas turbocharger.

* * * * *